G. R. H. MILLER.
THRASHING-MACHINE.

No. 185,252.  Patented Dec. 12, 1876.

WITNESSES:  INVENTOR:

UNITED STATES PATENT OFFICE.

GEORGE R. H. MILLER, OF OREGON CITY, OREGON.

IMPROVEMENT IN THRASHING-MACHINES.

Specification forming part of Letters Patent No. 185,252, dated December 12, 1876; application filed July 31, 1876.

*To all whom it may concern:*

Figure 1:
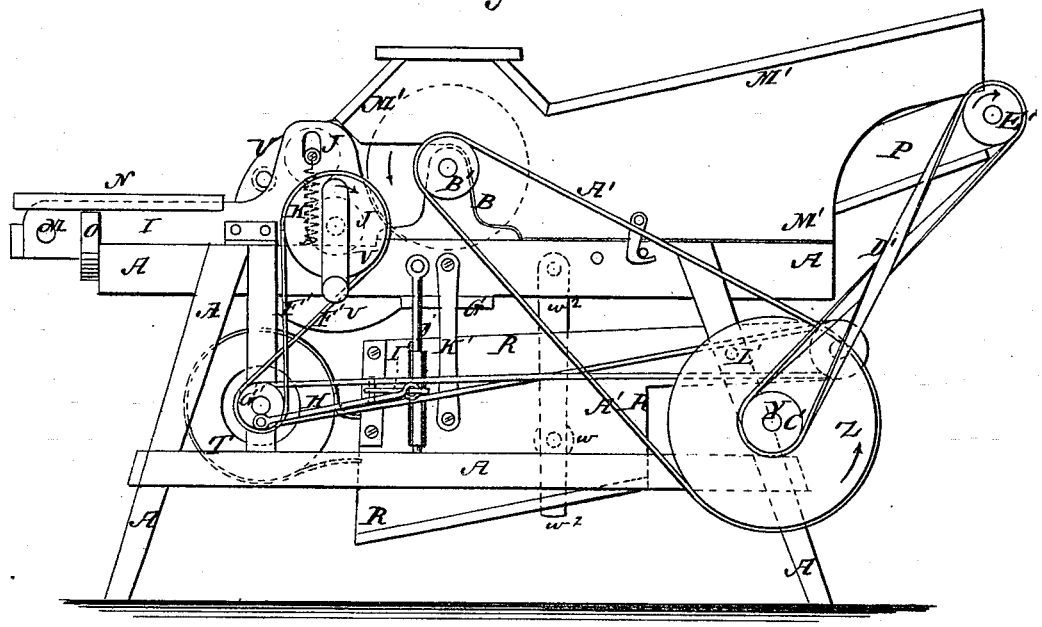
Figure 2:
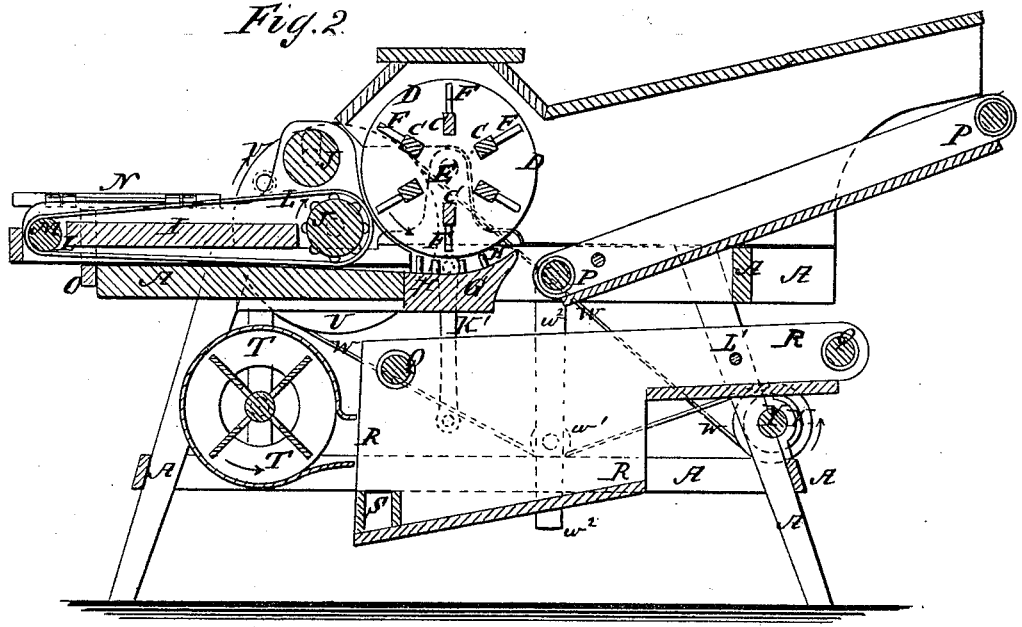
Figure 3:
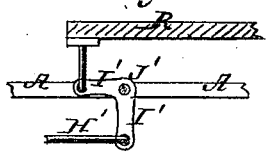

Be it known that I, GEORGE R. H. MILLER, of Oregon City, in the county of Clackamas and State of Oregon, have invented a new and Improved Combined Grain Thrasher and Cleaner, of which the following is a specification:

Figure 1 is a side view of my improved machine. Fig. 2 is a vertical longitudinal section of the same. Fig. 3 is a detail view of the device for operating the shaker.

The object of this invention is to furnish an improved machine for thrashing and cleaning grain, which shall be so constructed that it may be run by hand or other power, and which, at the same time, shall be simple in construction and effective in operation.

The invention will first be described in connection with the drawing, and then pointed out in the claim.

A is the frame of the machine, to the middle parts of the side bars of which are attached brackets B, in bearings in which revolve the journals of the thrashing-cylinder. The thrashing-cylinder is formed by attaching the ends of bars C to two disks, D, which disks are attached at their centers to the shaft E that carries the cylinder. The teeth F may be attached to the bars C by screwing them into screw-holes formed in said bars, or by inserting them in plain holes in the bars, and securing them by nuts screwed upon their inner ends. To the frame A, directly beneath the thrashing-cylinder, is secured the concave G, the teeth H of which may be so arranged that they may mesh into the teeth F of the cylinder or not, as may be desired. The concave G may be made with or without teeth, and when without teeth it may be corrugated or made smooth, as may be desired.

The concave G may be secured to the frame A adjustably by bolts, so that it may be adjusted closer to or farther from the cylinder, as may be desired.

I is the feed-table, which is placed upon the forward end of the frame A, and is secured in place adjustably by bolts, so that it may be moved forward or back, according as the stalks of the grain may be longer or shorter. To the inner end of the feed-table I are pivoted two feed-rollers, J, the lower one of which is ribbed or corrugated. The journals of the upper feed-roller J revolve in slots, so that it may rise to adjust itself to the thickness of the grain, and is held down to its work by spiral springs K, the upper ends of which are attached to the journals of the said roller, and their lower ends are attached to the table I. The feed-table I may be provided with an endless-belt carrier, L, that passes around the lower roller J and around a roller, M, pivoted to the outer end of the table I. To the sides of the feed-table I are hinged wings N, which are supported, when turned out into a position for use, by resting upon the ends of a cross-bar, o, attached to the said table I.

The straw and grain pass from the thrashing-cylinder to the carrier P, which is secured detachably and adjustably to the frame A, so that it may be detached when not required for use, and may be adjusted at any desired inclination. The straw is carried up by the carrier, and is discharged at the rear end of the machine. The grain falls upon the close bottom of said carrier, slides down it, and falls upon the chaff-carrier Q, through which it passes to the screens. The rollers of the chaff-carrier Q are pivoted to the shaker R. The grain passes down the lower screen into the spout S, through which it passes out of the machine. The small seeds pass through the lower screen, slide down the close bottom of the shaker R, and pass out beneath the spout S. The grain, while passing from the straw-carrier P to the spout S, is exposed to a current of air from the fan-blower T, placed in the lower forward part of the frame A.

To the journals of the lower feed-roller J are attached crank-pulleys U V, to the cranks of which the power is applied when the machine is to be run by hand. Around the pulley U, which is made of the same size as the pulley V, passes a belt, W, which is crossed and passed around a pulley, X, attached to the end of the counter-shaft Y. The tension of the belt W is regulated by the pulley $w^1$, which rests upon it, and which is pivoted to the lower part of the bar $w^2$. The bar $w^2$ is pivoted at its upper end to the frame A, so that it may be adjusted to regulate the tension of the belt W, as required. The counter-shaft Y revolves in bearings attached to the rear end of the frame A, and to its other end is attached a large pulley, Z, around which passes a belt, A'. The belt A' also passes around a pulley, B', attached to the journal of the thrashing-cylinder. To the end of the counter-shaft Y is also attached a small pulley, C', around which passes a belt, D'. The belt D' is crossed and passes around a pulley, E', attached to the journal of the upper roller of the straw carrier P. Around the crank-pulley V passes a belt, F', which is crossed and is passed around a pulley, G', attached to the shaft of the fan-blower T. To the pulley G' is attached a crank-pin, to which is pivoted the end of a connecting-rod, H'. The other end of the connecting-rod H' is pivoted to the outer arm of the crank-lever I', which is pivoted at its angle to a rod, J', attached to the frame A. The other arm of the lever I' is pivoted to the side of the shaker R, so that the said shaker may be driven from the fan-shaft. The forward part of the shaker R is supported by spring-bars K', the lower ends of which are attached to its sides, and their upper ends are attached to the top bars of the frame A. The rear end of the shaker R is loosely hung upon the rod L', attached to the frame A. The thrashing-cylinder and the straw-carrier are covered with a casing, M', to prevent the grain and straw from being scattered about by the action of the thrasher. The lower part of the machine should also be incased, to confine the blast and direct it against the grain to properly clean it.

Having thus described my invention, what I claim as new, and desire to secure by Letters Patent, is—

The sliding feed-table I of a thrasher, made adjustable to and from the cylinder, and provided with feeding-belt L, and having roller J, substantially as and for the purpose specified.

GEORGE R. H. MILLER.

Witnesses:
   JOHN G. PILSBURY,
   JOHN L. BARLOW,
   W. C. JOHNSON.